Figure 1:
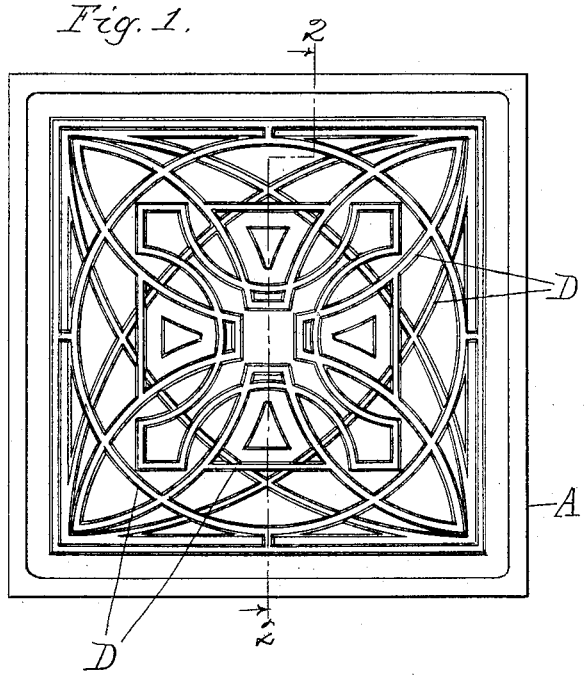

(No Model.) 2 Sheets—Sheet 1.

J. M. EWEN.
FIGURED PRISM LIGHT.

No. 595,264. Patented Dec. 7, 1897.

Witnesses,
E. T. Wray.
Donald M. Carter

Inventor,
John M. Ewen
by Francis W. Parker, Atty.

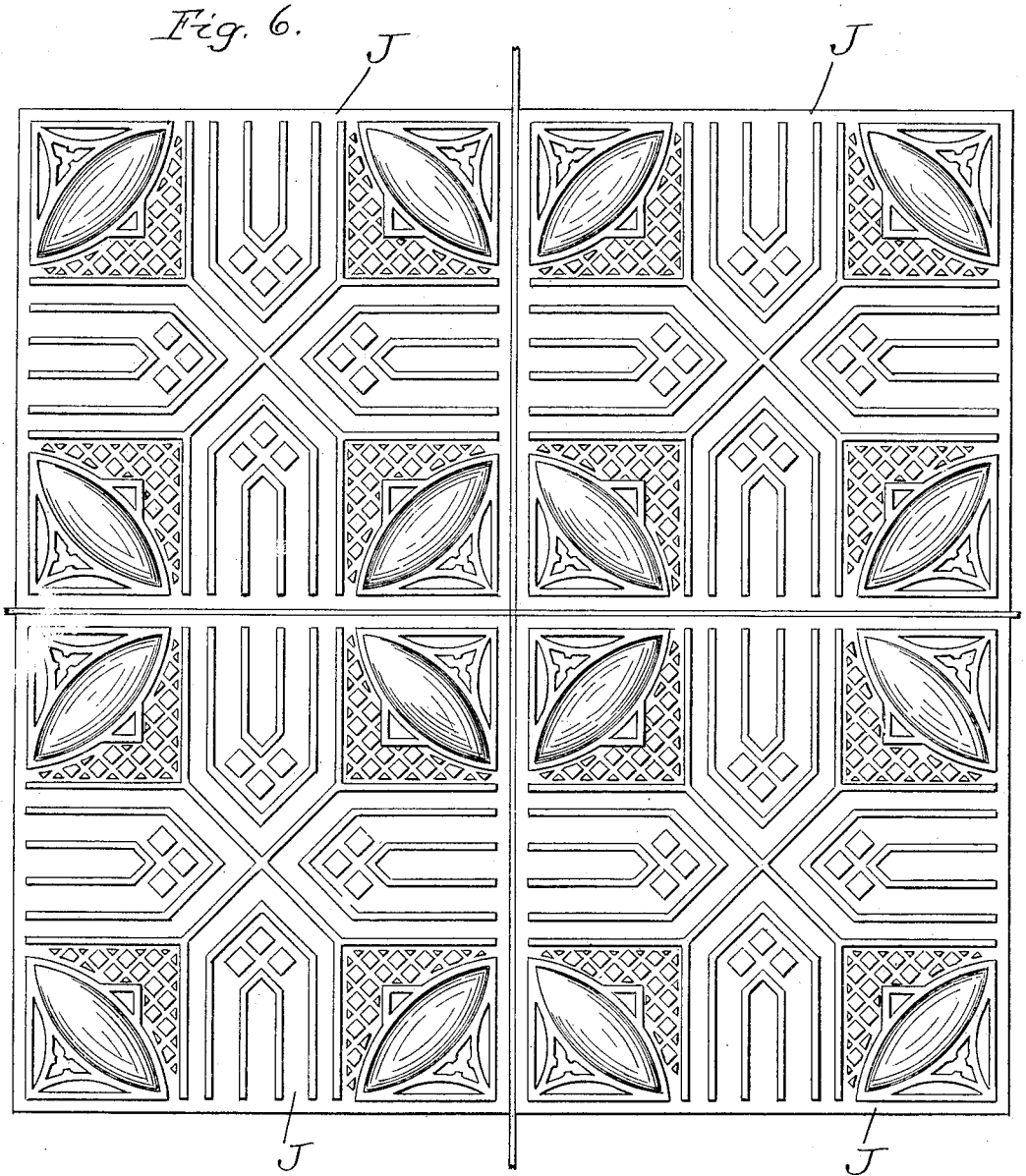

UNITED STATES PATENT OFFICE.

JOHN MEIGGS EWEN, OF CHICAGO, ILLINOIS, ASSIGNOR TO THE LUXFER PRISM PATENTS COMPANY, OF SAME PLACE.

FIGURED PRISM-LIGHT.

SPECIFICATION forming part of Letters Patent No. 595,264, dated December 7, 1897.

Application filed September 27, 1897. Serial No. 653,236. (No model.)

*To all whom it may concern:*

Be it known that I, JOHN MEIGGS EWEN, a citizen of the United States, residing at Chicago, in the county of Cook and State of Illinois, have invented certain new and useful Improvements in Prism Lights and Pl~~~s, of which the following is a specification.

My invention relates to prism-lights, and has for its object to produce new and useful improvements in prism lights and plates designed to produce an increased illuminating effect when applied to the windows of apartments. The prism-lights as commonly used are molded, though of course they may be made in other ways. They consist usually of a comparatively thin substantially flat body of glass a few inches square, (though of course they may be larger,) and they have commonly on one side a series of prisms systematically arranged to produce an increased illuminating effect and on the other side a relatively smooth surface. In molding or forming these prism-lights it is found that this comparatively smooth surface will be somewhat irregular owing in part to the peculiarities of the glass and in part to the impossibility of always having an equal amount of glass in the mold and in part to the contraction and expansion and to the cooling and reheating of the glass in the process of molding, and perhaps to other causes. When the prism-lights are assembled together to form a prism-plate, the exterior surface of such prism-plate will be found to consist of a series of surfaces which are slightly wavy and irregular and which have occasionally serious blemishes and are almost throughout their entire extent glazed, as it were. When, therefore, you look at such a plate from without, the effect is to a very great degree inartistic and unsatisfactory. Moreover, in the formation of such prism-lights very great difficulties will be encountered owing to the irregularity of the contraction and expansion of the glass, and thus there is always a considerable percentage of breakages. This difficulty is particularly observed with reference to the smooth surface as the prism-lights are commonly formed. The bottom of the mold usually contains the prism-forming grooves, and the plunger which descends upon the glass in the mold tends of course to cool its upper surface, and when this plunger is withdrawn the upper or smooth surface of the prism-light again becomes hot, and it is perhaps to this action that the glaze on the surface is due. The objects of my invention, among other things, are to avoid this wavy effect, to prevent or at least obscure and render imperceptible the irregularities and imperfections otherwise noticeable upon the receiving-surface of the prism-light, to prevent the contraction and expansion in the prism-light, and thus to prevent breakages. These results, among others, I accomplish by the means illustrated in the accompanying drawings.

Broadly speaking, I propose to form on the receiving side of the prism-light a design as distinguished from mere corrugations, striations, light-directing prisms, or mere markings, which shall preferably be characterized by the absence of extended surface areas and the absence of broad or wide lines in the design, such design to be either raised or sunken and its various elements, if desired, of varying depths or altitudes, as the case may be, and of varying widths, if desired. Such a design formed on the receiving-surface of the prism-light will lead to various results. In the first place the design raised or depressed when seen from the prism side is varied or altered slightly as you move from position to position while observing such design. It is in a sense a variable design as seen through the prisms, and, moreover, its lines are softened, so as to produce a very pleasing effect and relieve the prism-light of its more or less otherwise harsh appearance when seen from within. In the second place such a design when seen from without, as well as when seen from within, has the appearance of a sort of texture formation, especially when seen from a considerable distance, as is necessarily the case in ordinary practice. The elements out of which the design are formed become thread-like, and if the design is properly made produce an effect like lace. In the third place the design having broken up the receiving-surface into several small divisions, areas, or sections necessarily destroys the wavy effect above referred to, for though these several areas or surfaces still individually have the wavy effect their areas are so small and the effect is so much interrupted by the design proper that the wavy effect is not noticeable. In the fourth place the distortion of the receiving-surface is almost entirely prevented in the process of forming the prism-light. This is probably brought about in the following manner: When the plunger descends on the receiving-surface, it chills and slightly cools such surface. When the plunger rises, the depressed or lower surfaces of the receiving-surface being nearer to the inner and heated glass are remelted, but the raised portions of the design being farther therefrom and exposed on three sides are not remelted and they serve as a sort of grid to hold the molten parts in position and keep them from running or changing form, and thus the imperfections of the receiving-surface above referred to and which are so common in ordinary prism-lights are to a great extent obviated. If any such imperfections nevertheless do exist in the finished product, they are obliterated and their effects destroyed by the presence of the raised lace-like design. In the fifth place the upper or outer surface of the raised portions of the design, since they do not appear to melt when the plunger is raised, do not become glazed, and hence all that surface is free from the glazed effect. In the sixth place, by distributing over the receiving-surface of the prism-light a design such as described the contraction and expansion of the prism-light, both while being formed and when finished, is more uniformly distributed and the various strains within the glass are accommodated for in such way as to greatly prevent or diminish the breakages. In the seventh place the shear-marks, which are almost invariably found on the so-called "receiving-surface" of the prism-light and which result from the action of the shears in clipping or cutting off the molten glass as it runs into the mold are, if not obliterated, at least broken up and distributed in such a manner by the design as to be imperceptible, or at least not offensively present, which is the case when they appear upon the extended smooth surface. In the eighth place the difficulties and disadvantages incident to the varying quantity of glass in the mold are obviated. In forming devices of this kind the molten glass is put into the mold and the operator cuts off the running stream when, in accordance with his trained judgment, a sufficient quantity of glass has entered the mold, but obviously he never can twice cut off exactly the same amount and irregularity in the size, shape, or appearance of the finished product must result from this variation in the amount of glass. This commonly appears in the surface and distorts or disfigures it. Now with this design as suggested the excess of glass in the mold is carried as an overflow into the figure or into the several raised surfaces and does not appear in any offensive or disfiguring manner. It is practically obliterated. In like manner, if the glass is less than the required amount the irregularity is lost in the design. I have not attempted, of course, to show any considerable number of forms of my invention. I have, however, illustrated it, as it were, diagrammatically, so that it can be understood.

Figure 2:
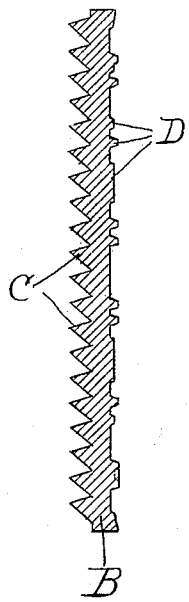
Figure 3:
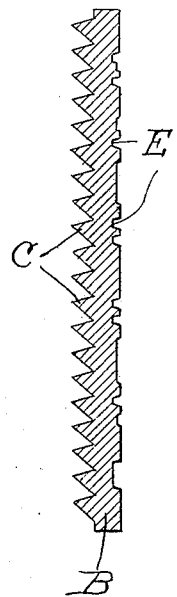
Figure 4:
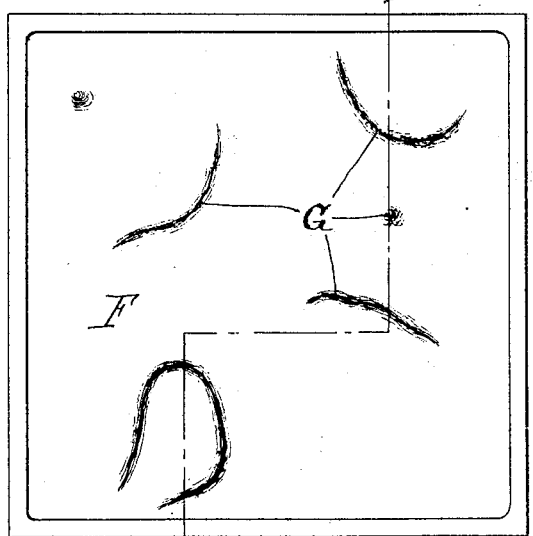
Figure 5:
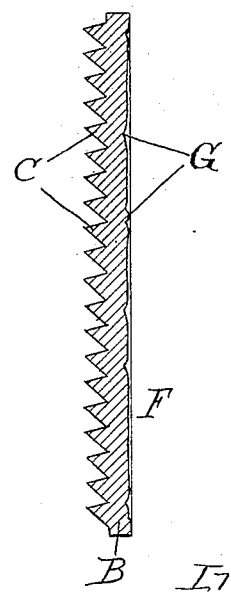

Figure 1 is an elevation of a prism-light, showing a design formed of raised thread-like glass portions. Fig. 2 is a section therethrough on the line 2 2 of Fig. 1. Fig. 3 is a section of a similar prism-light where the design is formed by sinking the grooves. Fig. 4 is a plan view of a prism-light where the receiving-surface has no design, but is more or less irregular. Fig. 5 is a section therethrough. Fig. 6 is a view of a series of prism-lights associated together and showing a design so formed as to be carried over a series of such lights, the lights being incorporated together by a frame so as to form a prism-plate.

Like parts are indicated by the same letters in all the figures.

A is a prism-light having the body portion B, the prisms C, the raised design elements D D, or the sunken design elements E. F is the receiving-surface when no design is used. G G indicate irregularities thereon. J J are prism-lights having the design, as indicated. Of course these designs are merely illustrative and the design may be almost infinitely varied and can be greatly changed from time to time, as taste may dictate. When the design is so formed, all the objects above referred to will be attained. The wavy effect will disappear, the receiving-surface imperfections will either disappear or be negligible, the top surface of the design will not be wavy, the design will have a lace-like appearance, the glass of the lower surfaces when remelted after the lifting of the plunger will be held in place by the grid-like elements of the design, and the design when viewed from the prism side will have soft lines and be variable as the observer moves about. The excess or insufficient amount of glass in the mold will produce no unsatisfactory appearance, because it will be lost in the design and the marks of the shears will not appear to disfigure the receiving-surface.

Of course the prism-light can be of different size, thickness, and shape from that shown, but the preferred form is one which is substantially rectangular and substantially flat and having dimensions of a few inches each and which is comparatively thin and made of clear and brilliant glass. I do not wish, however, to be limited to these particulars, for, as above pointed out, my invention may be incorporated under other conditions. I have spoken of the "receiving" side and the "prism" side. Of course the light can be received from the prism side, but under ordinary conditions the smooth side is accepted as the receiving side, and it is with this understanding that I use the term "receiving"

side. It is to be observed that the receiving-surface according to my invention is preferably provided with a design distinguished from mere markings which do not produce the effect, for it is in part because the eye is arrested by the design as such that the glittering effect of the wavy surface is lost sight of. Moreover, the lines which form the design are also preferably distinguished from grooves or markings having inclined sides or edges, though I prefer a very slight inclination to the edges of the elements of the design. Still if these sides are considerably inclined—as, for example, in the case of mere corrugations—then the illuminating effect of the prism-light is very greatly reduced, and this is not permissible, since of course the primary object of the prism-light is to illuminate the interior with which it is associated.

Of course, as I have described my invention, it will be clear that the above results are obtained by molding or forming the transparent material in the manner indicated in the process of the construction of the prism-light.

Of course these prism-lights are commonly made of glass. The various lines of which the design are formed need not intersect each other, though in many forms of the design this might be preferred. I have spoken of "wavy" surfaces. What I mean in distinguishing the glazed effect of the two surfaces—that of the field-surface and of the design-surface—is this: The reheating of the "field-surface," so called, when the plunger rises produces a surface which differs perhaps in degree of wavy appearance or polish from the so-called "design-surface," which is not a reheated surface, and that is the point which I mean to bring out by the use of the terms "wavy" and "not waved," as applied to these surfaces.

What I have spoken of as the "grid-like" formation, which holds the surface and prevents the same from being disfigured, may of course take the shape or form as indicated in the drawings, but what I mean by the use of the term "grid" broadly to indicate is such a formation, whether the same be made of raised or depressed lines and whatever the cross-section of those lines and whether such lines be continuous or broken into a series of short lines, as will serve during the process of forming the prism-light to hold the surface as described. Obviously there may be great variation in the form, the number, and the arrangement of the several lines or elements, raised or depressed, which are produced in my prism-light so as to bring about either one or the other, or both, of these results, or one or several of the various results alluded to hereinbefore.

I have spoken of the "receiving" side, but of course it will be understood that this term is simply used as a convenient term and not as a limiting term, since either side of the plate may be used as a receiving side. I have contemplated making the design or the grid-like formation either as a single design to cover the whole or a part of the receiving-surface, or a series of distinct designs or a series of connected designs, or any other variation, as taste may dictate.

I claim—

1. A prism-light comprising a substantially flat and thin body of transparent material with a series of small prisms on one side thereof, systematically arranged to produce an increased illuminating effect and distributed in a substantially uniform manner over the prism side and a grid-like design on a part of the receiving side formed of lines produced in the transparent material and extending over a considerable portion of such receiving-surface, so as to leave no relatively large unbroken surfaces thereon, said lines formed of the substance of the prism-light.

2. A prism-light comprising a substantially flat and thin body of transparent material with a series of small prisms on one side thereof, systematically arranged to produce an increased illuminating effect and distributed in a substantially uniform manner over the prism side and a grid-like design on a part of the receiving side formed of lines produced in the transparent material and extending over a considerable portion of such receiving-surface, so as to leave no relatively large unbroken surfaces thereon, said lines formed of the substance of the prism-light and slightly elevated above the general surface of the receiving side.

3. A prism-light comprising a substantially flat and thin body of transparent material with a series of small prisms on one side thereof, systematically arranged to produce an increased illuminating effect and distributed in a substantially uniform manner over the prism side and a grid-like design on a part of the receiving side formed of lines produced in the transparent material and extending over a considerable portion of such receiving-surface, so as to leave no relatively large unbroken surfaces thereon, said lines provided with edges in planes substantially perpendicular to the receiving-surface, said lines formed of the substance of the prism-light.

4. A prism-light comprising a substantially flat and thin body of transparent material with a series of small prisms on one side thereof, systematically arranged to produce an increased illuminating effect and distributed in a substantially uniform manner over the prism side and a grid-like design on a part of the receiving side formed of lines produced in the transparent material and extending over a considerable portion of such receiving-surface, so as to leave no relatively large unbroken surfaces thereon, said lines of thin and of practically uniform cross-section, said lines formed of the substance of the prism-light.

5. A prism-light comprising a substantially flat and thin body of transparent material with a series of small prisms on one side thereof, systematically arranged to produce an increased illuminating effect and distributed in a substantially uniform manner over the prism side and a grid-like design on a part of the receiving side formed of lines produced in the transparent material and extending over a considerable portion of such receiving-surface, so as to leave no relatively large unbroken surfaces thereon, said lines produced in the transparent material and slightly elevated above the general surface of the receiving side and provided with edges which are in planes substantially vertical to the receiving-surface, said lines formed of the substance of the prism-light.

JOHN MEIGGS EWEN.

Witnesses:
DONALD M. CARTER,
HOMER L. KRAFT.